United States Patent
Chen

(10) Patent No.: US 6,803,907 B2
(45) Date of Patent: Oct. 12, 2004

(54) WIRELESS BEAM-PEN POINTING DEVICE

(75) Inventor: Ping-Chon Chen, Taipei (TW)

(73) Assignee: Inventec Corporation, Taipei (TW)

( * ) Notice: Subject to any disclaimer, the term of this patent is extended or adjusted under 35 U.S.C. 154(b) by 175 days.

(21) Appl. No.: 09/969,734

(22) Filed: Oct. 4, 2001

(65) Prior Publication Data

US 2003/0067438 A1 Apr. 10, 2003

(51) Int. Cl.$^7$ ............................. G09G 3/28; G08C 21/00
(52) U.S. Cl. ................. 345/182; 178/19.01; 178/19.02; 178/19.05
(58) Field of Search ................................. 345/156, 157, 345/158, 159, 160, 170, 179, 180, 182, 183; 178/18.01, 18.03, 18.04, 19.01, 19.02, 19.03, 19.04, 19.05

(56) References Cited

U.S. PATENT DOCUMENTS

| | | | | |
|---|---|---|---|---|
| 5,495,269 A | * | 2/1996 | Elrod et al. .................. | 345/179 |
| 5,515,079 A | * | 5/1996 | Hauck ......................... | 345/157 |
| 5,914,783 A | * | 6/1999 | Barrus ......................... | 356/614 |
| 6,323,839 B1 | * | 11/2001 | Fukuda et al. .............. | 345/157 |

* cited by examiner

Primary Examiner—Vijay Shankar
(74) Attorney, Agent, or Firm—Rothwell, Figg, Ernst & Manbeck

(57) ABSTRACT

A wireless beam-pen pointing device is proposed, which is designed for use with a computer unit, a presentation screen, and a beam pen. The presentation screen is coupled with a beam-spot position detector which is capable of detecting the beam-spot position where the light beam strikes on the presentation screen and transfer the beam-spot position data to the notebook computer. In response, the notebook computer will move the cursor to the detected beam-spot position. The beam pen is capable of emitting a light beam, such as a laser beam, which allows the speaker to point the light beam at a particular object displayed on the presentation screen that is currently being mentioned in the speaker's speech. The cursor movement is under control by the light beam, so that the cursor will be moved to the location currently pointed by the light beam. When the presentation speaker wants select an object or choose a command currently pointed by the cursor, he/she needs just to click or double click the buttons on the beam pen. This action will cause the beam pen to output a control signal and send it via wireless link to the notebook computer, causing the notebook computer to select the object or choose the command currently pointed by the cursor.

10 Claims, 3 Drawing Sheets

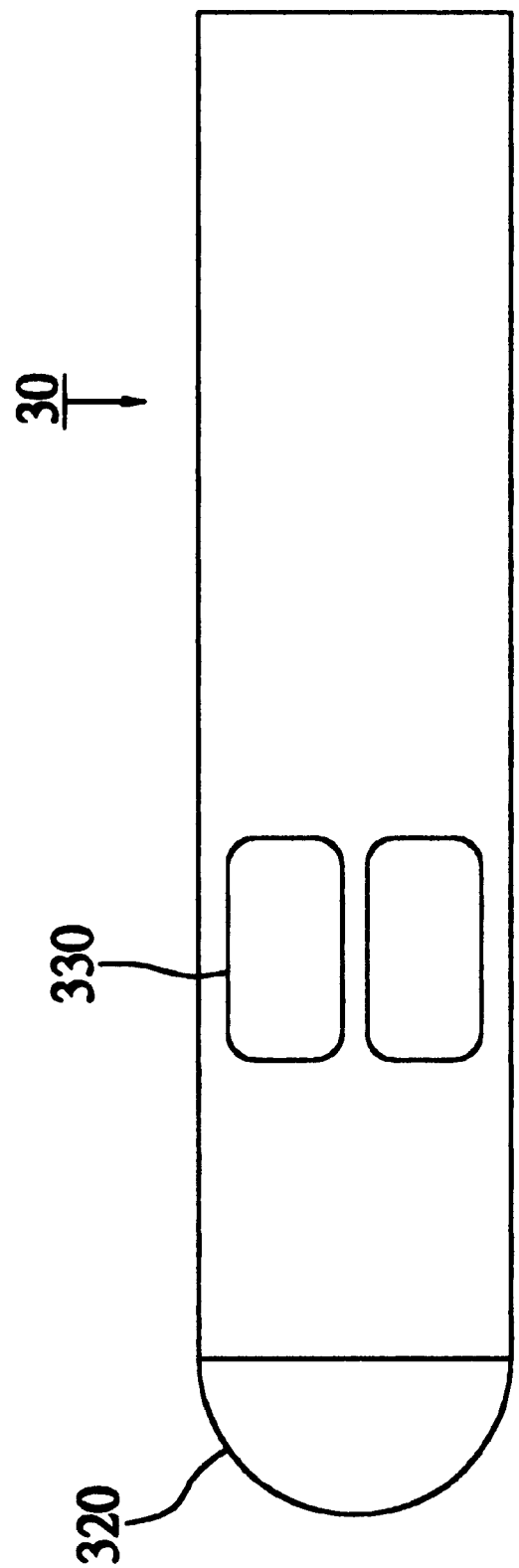

WIRELESS BEAM-PEN POINTING DEVICE

BACKGROUND OF THE INVENTION

1. Field of the Invention

This invention relates to a computer peripheral device, and more particularly, to a wireless beam-pen pointing device which is designed for use with a computer unit, such as a notebook computer, a presentation screen, and a beam pen, for the purpose of allowing the user to operate the on-screen cursor and functions displayed on the presentation screen through the use of the beam pen.

2. Description of Related Art

A common practice in the presentation of a computer software product is to use a notebook computer connected to a large-size presentation screen, so that the software being presented can be displayed on the presentation screen for convenient viewing by all people in the audience.

Typically, the presentation screen is connected via a cable to the notebook computer and is located from the notebook computer by a distance. During the presentation, the speaker typically use an elongated pointing stick or a laser beam pen to point out a particular object displayed on the presentation screen that is being mentioned in his/her speech. However, since the presentation screen is located at a distance from the notebook computer, it typically requires an assistant to sit by the notebook computer and use the built-in pointing device of the notebook computer to operate the on-screen cursor and functions that are currently mentioned by the speaker.

The forgoing practice, however, has the following drawbacks. First, since the assistant has to follow the speaker's speech while operating the on-screen cursor and functions, the cursor actions displayed on the presentation screen to the audience may always lag behind the speaker's speech, making the progress of the presentation quite slow and inefficient. Second, the employment of an assistant to help the speaker operate the on-screen cursor and functions would increase the overall cost of human power, making the presentation quite cost-ineffective.

One solution to the foregoing problem is to let the speaker operate the notebook computer entirely by himself/herself. One drawback to this practice, however, is that it requires the user to walk repetitively between the presentation screen and the notebook computer, which means that the speaker's speech would be frequently interrupted, making the presentation quite slow and inefficient in progress.

SUMMARY OF THE INVENTION

It is therefore an objective of this invention to provide a wireless beam-pen pointing device which allows the speaker to operate the on-screen cursor and functions entirely by himself/herself without the help of an assistant, so that the overall human power cost can be reduced.

It is another objective of this invention to provide a wireless beam-pen pointing device which allows the speaker to operate the on-screen cursor and functions while standing in front of the presentation screen, without having to walk repetitively between the presentation screen and the notebook computer, so that the presentation can be made more smooth and efficient in progress.

It is another objective of this invention to provide a wireless beam-pen pointing device which allows the speaker to operate the on-screen cursor and functions while standing at any convenient locations in the presentation room.

The wireless beam-pen pointing device of the invention is designed for use with a computer unit, a presentation screen, and a beam pen. The computer unit includes: a CPU, a presentation screen connection interface, and a wireless interface. The beam pen includes: (a) a main control circuit; (b) a beam emitter, under control of the main control circuit, for emitting a light beam for the purpose of pointing out a particular object displayed on the presentation screen; (c) a cursor function button set, which can generate a control signal when being pressed; and (d) a wireless interface, under control of the main control circuit, for transferring the control signal via wireless link to the wireless interface of the computer unit.

The presentation screen is coupled with a beam-spot position detector which is capable of detecting the beam-spot position where the light beam strikes on the presentation screen and transfer the beam-spot position data to the notebook computer. In response, the notebook computer will move the cursor to the detected beam-spot position.

When the presentation speaker wants select an object or choose a command currently pointed by the cursor, he/she needs just to click or double click the left/right button in the cursor function button set. This action will cause the cursor function button set to output and transfer a control signal via the main control circuit to the wireless interface and subsequently via wireless link to the wireless interface of the notebook computer. The wireless interface of the notebook computer then demodulates the received wireless signal to recover the original control signal and then send it to the CPU to cause the CPU to select the object or choose the command currently pointed by the cursor.

Compared to the prior art, the invention allows the speaker to operate the on-screen cursor and functions entirely by himself/herself without the help of an assistant. This can help reduce the cost of human power and allows the presentation to be carried out more efficiently in progress. Moreover, the invention allows the speaker to conveniently operate the on-screen cursor and functions while standing anywhere in the presentation room without having to walk repetitively between the presentation screen and the notebook computer.

BRIEF DESCRIPTION OF DRAWINGS

The invention can be more fully understood by reading the following detailed description of the preferred embodiments, with reference made to the accompanying drawings, wherein:

FIG. 3 shows the outer appearance of the beam pen utilized by the wireless beam-pen pointing device of the invention.

DETAILED DESCRIPTION OF PREFERRED EMBODIMENTS

The wireless beam-pen pointing device according to the invention is disclosed in full details by way of preferred embodiments in the following with reference to the accompanying drawings FIG. 1 through FIG. 3.

Figure 1:
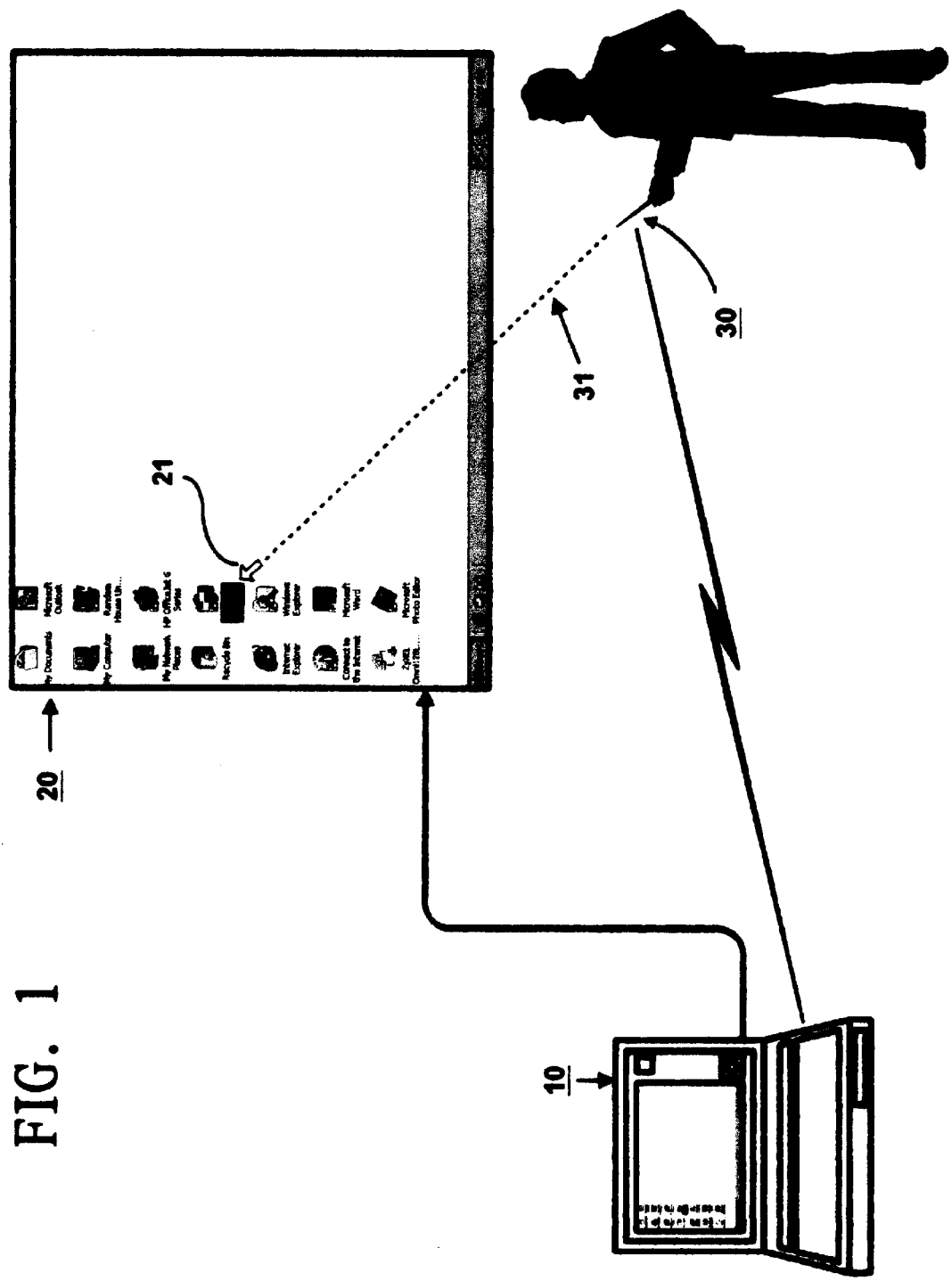
FIG. 1 is a schematic diagram showing the utilization of the wireless beam-pen pointing device of the invention.

Referring to FIG. 1, the wireless beam-pen pointing device of the invention is designed for use with a computer unit, such as a notebook computer 10, a presentation screen 20, and a beam pen 30. The presentation screen 20 is a large-size monitor screen which is externally connected to the notebook computer 10 for the purpose of displaying the operation system and applications running on the notebook computer 10 in a larger size that can be viewed by all people in the audience. The beam pen 30 is capable of emitting a light beam 31, such as a laser beam, which allows the speaker to point the light beam 31 at a particular object displayed on the presentation screen 20 that is currently being mentioned in the speaker's speech. It is a characteristic feature of the invention that the cursor 21 can be moved under control of the light beam 31 (i.e., the cursor 21 will be moved to the location currently pointed by the light beam 31).

Figure 2:
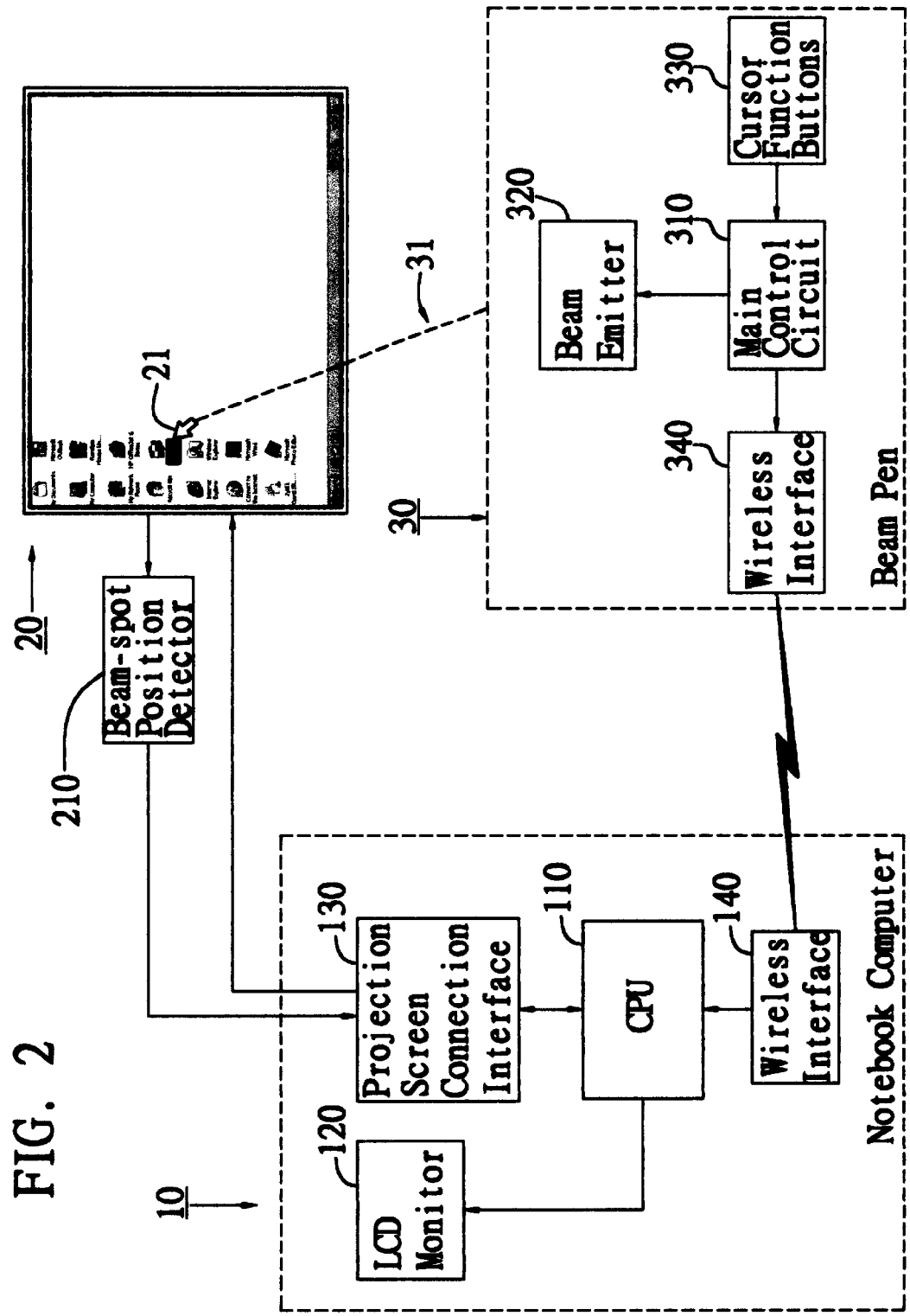
FIG. 2 is a schematic block diagram showing the system architecture of the wireless beam-pen pointing device of the invention.

FIG. 2 is a schematic block diagram showing the system architecture of the wireless beam-pen pointing device of the invention. As shown, the notebook computer 10 includes a CPU (central processing unit) 110, an LCD (liquid crystal display) monitor 120, a presentation screen connection interface 130, and a wireless interface 140 (note that FIG. 2 only shows only those system components of the notebook computer 10 that are related to the invention; other unrelated components are not shown for simplification of the drawing). Since these system components 110, 120, 130, 140 are all well-known computer components, description thereof will not be detailed.

The presentation screen 20 is coupled with a beam-spot position detector 210 which is capable of detecting the beam-spot position where the light beam 31 strikes on the presentation screen 20 and transfer the beam-spot position data to the notebook computer 10. In response, the CPU 110 of the notebook computer 10 will move the cursor 21 to the detected beam-spot position.

During normal use, the notebook computer 10 uses its LCD monitor 120 to display the operating system and applications running thereon, and the user can use its built-in pointing device, such as a touchpad, a track ball, or an externally connected mouse, to operate the on-screen cursor and functions. During presentation, the user can connect the notebook computer 10 via the presentation screen connection interface 130 to a large-size presentation screen 20, so that the contents to be presented can be conveniently viewed by all people in the audience.

As shown in FIG. 2, the beam pen 30 includes a main control circuit 310, a beam emitter 320, a cursor function button set 330, and a wireless interface 340. FIG. 3 shows the outer appearance of the beam pen 30.

The main control circuit 310 is used to control the operations of the beam emitter 320, the cursor function button set 330, and the wireless interface 340. The beam emitter 320 is, for example, a laser type that can emit a laser beam to allow the user to point out any particular object displayed on the presentation screen 20 that is mentioned in the speaker's speech.

The cursor function button set 330 is identical in function to the well-known left/right buttons on a mouse, which allows the user to select an object or choose a command currently pointed by the cursor 21. Since the cursor function button set 330 is well-known, description thereof will not be further detailed.

When one button in the cursor function button set 330 is pressed by the user, it will output and transfer a control signal via the main control circuit 310 to the wireless interface 340 where it is modulated into a wireless signal and transmitted via the ether to the wireless interface 140 of the notebook computer 10. The wireless interface 140 of the notebook computer 10 then demodulates the received wireless signal to recover the original control signal and send it to the CPU 110 to cause the CPU 110 to select the object or choose the command currently pointed by the cursor 21.

During presentation, the speaker can hold the beam pen 30 in one hand and point the light beam 31 emitted from the beam pen 30 at a particular object displayed on the presentation screen 20 that is currently being mentioned in his/her speech. When striking on the presentation screen 20, the emitted light beam 31 from the beam pen 30 will form a beam spot on the presentation screen 20, and the position of this beam spot can be detected by the beam-spot position detector 210 which then transfers the detected beam-spot position data to the notebook computer 10, causing the notebook computer 10 to move the cursor 21 to the detected beam-spot position.

When the speaker wants to select an object or choose a command currently pointed by the cursor 21, he/she needs just to click or double click the left/right button in the cursor function button set 330. This action will cause the cursor function button set 330 to output and transfer a control signal via the main control circuit 310 to the wireless interface 340 and subsequently via the wireless link to the wireless interface 140 of the notebook computer 10. The wireless interface 140 of the notebook computer 10 then demodulates the received wireless signal to recover the original control signal and send it to the CPU 110 to cause the CPU 110 to select the object or choose the command currently pointed by the cursor 21.

In conclusion, the invention provides a wireless beam-pen pointing device which is designed for use with a computer unit, such as a notebook computer, a presentation screen, and a beam pen, for the purpose of allowing the user to operate the on-screen cursor and functions displayed on the presentation screen through the use of the beam pen.

Compared to the prior art, the invention allows the speaker to operate the on-screen cursor and functions entirely by himself/herself without the help of an assistant. This can help reduce the cost of human power and allows the presentation to be carried out more efficiently in progress. Moreover, the invention allows the speaker to conveniently operate the on-screen cursor and functions while standing anywhere in the presentation room without having to walk repetitively between the presentation screen and the notebook computer. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A wireless beam-pen pointing device for use with a computer unit and a presentation screen connected to the computer unit, the computer unit including a CPU, a presentation screen connection interface, and a wireless interface, (a) a beam pen, which includes:

(a1) a main control circuit;

(a2) a beam emitter, under control of the main control circuit, for emitting a light beam for the purpose of pointing out a particular object displayed on the presentation screen;

(a3) a cursor function button set, which can generate a control signal when being pressed; and (a4) a wireless interface, under control of the main control circuit, for transferring the control signal via wireless link to the wireless interface of the computer unit; and (b) a beam-spot position detector, which is coupled between the presentation screen and the computer unit, and which is capable of detecting the position of a beam spot on the presentation screen produced by the light beam emitted from the beam emitter of the beam pen, the beam-spot position data being subsequently transferred to the computer unit to cause the computer unit to move the cursor to the detected beam-spot position.

2. The wireless beam-pen pointing device of claim 1, wherein the computer unit is a notebook computer.

3. The wireless beam-pen pointing device of claim 1, wherein the beam emitter is a laser type of beam emitter.

4. A beam pen, which comprises:

(a) a main control circuit;

(b) a beam emitter, under control of the main control circuit, for emitting a light beam for the purpose of pointing out a particular object displayed on a presentation screen;

(c) a cursor function button set, which can generate a control signal when being pressed; and (d) a wireless interface, under control of the main control circuit, for transferring the control signal via wireless link to a wireless interface of the computer unit.

5. The beam pen of claim 4, wherein the beam emitter is a laser type of beam emitter.

6. A method of using a beam pen having a main control circuit, a beam emitter under control of the main control circuit for emitting a light beam for the purpose of pointing out a particular object displayed on a presentation screen, a cursor function button set which can generate a control signal when being pressed, and a wireless interface under control of the main control circuit for transferring the control signal via a wireless link to a wireless interface of a computer unit, wherein the method comprises the steps of:

(a) pointing the beam pen at a beam-spot position detector which is capable of detecting the position of a beam spot on the presentation screen produced by the light beam emitted from the beam emitter of the beam pen; and (b) transferring beam-spot position data to the computer unit to cause the computer unit to move the cursor to the detected beam-spot position.

7. A beam-pen pointing device for use with a computer unit and a presentation screen connected to the computer unit, the computer unit including a CPU, a presentation screen connection interface, and a wireless interface, comprising:

(a) a beam pen, which includes:

(a1) a main control circuit;

(a2) a means for emitting a light beam at an object displayed on a presentation screen;

(a3) a means for generating a control signal when pressed; and (a4) a means for transferring the control signal to an interface of a computer unit; and (b) a beam-spot position detector having means for detecting the position of a beam spot emitted to said beam-spot detector from the beam pen and for transmitting a position signal to the computer unit to cause the computer unit to move a cursor to the detected beam-spot position.

8. The device of claim 7, wherein said means for generating a control signal is a cursor function button set.

9. The device of claim 7, wherein said means for emitting a light beam is a beam emitter.

10. The device of claim 8, wherein said cursor function button set includes left or right mouse functionality such that a user can select an object or choose a command currently pointed to.

* * * * *